May 28, 1963     D. L. KLASS ET AL     3,091,587
METHOD FOR TREATING HYDROCARBON MIXTURES
Filed Nov. 25, 1960
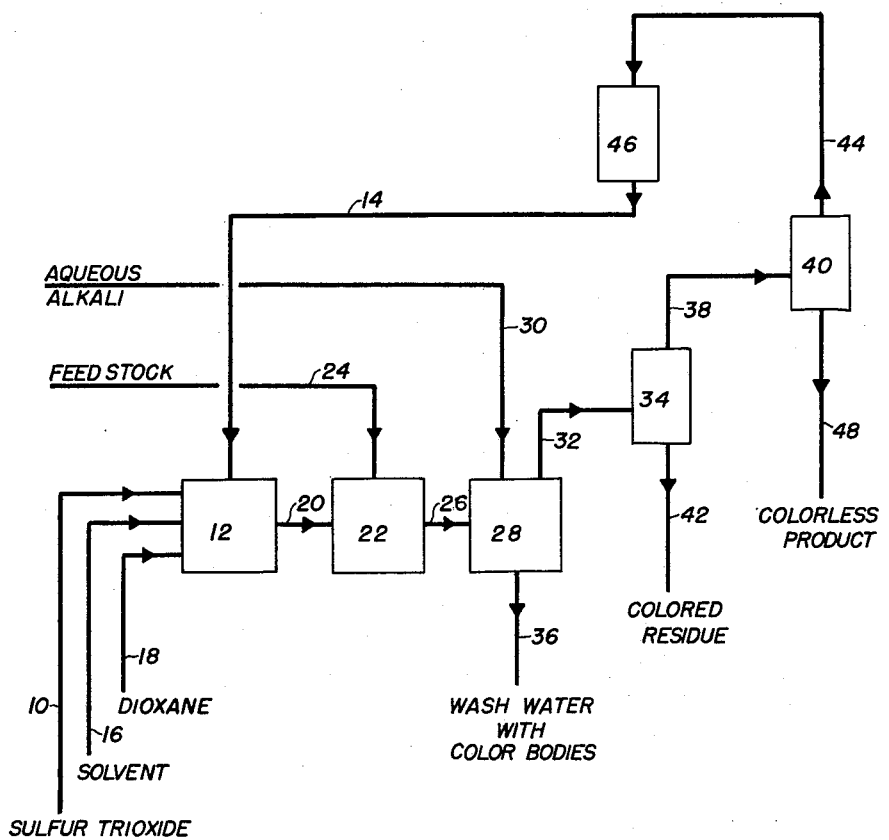
INVENTORS
DONALD L. KLASS
BY VINCENT BROZOWSKI
ATTORNEY

United States Patent Office 3,091,587
Patented May 28, 1963

3,091,587
METHOD FOR TREATING HYDROCARBON
MIXTURES
Donald L. Klass, Barrington, and Vincent Brozowski, Mundelein, Ill., assignors to The Pure Oil Company, Chicago, Ill., a corporation of Ohio
Filed Nov. 25, 1960, Ser. No. 71,665
20 Claims. (Cl. 208—293)

This invention relates to a process for decolorizing hydrocarbon mixtures and for improving the color stability of hydrocarbon mixtures. More particularly this invention relates to a method of decolorizing and improving the color stability of hydrocarbon mixtures, such as distillates, by treatment with sulfur trioxide complexes at a temperature sufficient to transform the color bodies into colorless form and separating a decolorized and/or color stable product.

The presence of color bodies of color-producing bodies in hydrocarbon mixtures has been a source of difficulty in the industry for a long period of time and many processes have been developed for the purpose of overcoming deleterious color and color instability propensities in hydrocarbon mixtures. Distillation in the presence of chemicals and absorbents, solvent extraction processes, the use of color inhibitors, clay treating and many other refining methods have been developed to improve the color, odor, stability and general physical properties of hydrocarbon mixtures. Certain products that have been refined exhibit color instability. For example, in distilling treated pressure distillate, pressed distillate, or bright stock solution, color disintegration becomes an acute problem because these products are in marketable form. Subsequent decolorizing treatments, after distillation, would increase the cost. Raw distillate from cracking units, after acid treatment are bright-yellow-colored materials, although part of the color bodies are high boiling and may be separated by distillation. Other portions decompose at high temperature and cause discoloration of the products.

The origin of color bodies in petroleum refinery streams is not really known. Such streams consist of liquid mixtures of paraffinic, olefinic, naphthenic and aromatic hydrocarbons with the concentrations of the various types of constituents varying in different streams. The colors thereof may vary from light yellow to medium brown to black because of the presence of color bodies which are from natural or artificial sources, and are probably formed by the reaction of the unsaturated linkages in the olefins with air, sulfur, and other substances.

Some refining operations are more conducive than others to the formation of color bodies, or of precursors for the future formation of color bodies. For example, the products of cracking operations are known to have increased tendency to become colored during processing or storage. In some uses, such as in gasolines, the resulting color, if not substantial, may not detract from the value of the mixtures, but in other uses, such as solvents for film-forming resins, color is undesirable.

Many methods and procedures have been proposed in the past for improving the color of petroleum products. For example, one of the oldest and most widely used methods is to treat highly-colored stocks with sulfuric acid or oleum. However, for each organic compound to be removed by this treatment there exists a definite minimum acid concentration, termed the "$\pi$" value, below which the desired reaction will not occur. Water is formed in the reactions too, thereby diluting the acid; consequently, far more than a stoichiometric amount of the sulfuric acid or oleum must be used to achieve the desired degree of color reduction. The resulting dilute waste acid must be neutralized and removed from the product, thereby increasing the caustic requirement to far above the amount theoretically required.

One obvious solution to at least part of the problems associated with the use of sulfuric acid or oleum is to use sulfur trioxide in place of the acid, because no water is formed in the reaction. However, sulfur trioxide is much more reactive than sulfuric acid and oleum, and it carbonizes many organic compounds when used in the pure state, even at low temperatures. Furthermore, sulfur trioxide is capable of reacting with compounds which contribute little to the color or color-forming propensity of the mixture. Nevertheless, sulfur trioxide, usually diluted with air or sulfur dioxide to reduce its activity, has been used in the past to upgrade petroleum-derived stocks. But in practically all of these sulfur trioxide processes the reaction goes too far, involving constituents other than the color bodies and compounds capable of forming color bodies, and require costly efficient temperature control to avoid excessive charring by the highly exothermic reactions.

Now, in accordance with this invention, we have discovered that sulfur trioxide complexed with a suitable complexing agent, such as dioxane, is effective in removing color bodies from highly colored stocks without significant effect on the other constituents present, and without the rigid temperature control required in previous processes. For example, we have found that treatment of a dark-colored "coker distillate" with sulfur trioxide-dioxane complex at temperatures as high as 90° C. effectively changes the color bodies to a form in which they can be removed by water washing, or from which a colorless product can be distilled.

Accordingly, it becomes a primary object of this invention to provide a process for removing color bodies from hydrocarbon mixtures.

An object of this invention is to provide a process for improving the color stability of hydrocarbon mixtures.

Another object of this invention is to provide a process for removing color bodies from hydrocarbon mixtures by treatment with sulfur trioxide complex.

A further object of this invention is to provide a process for removing color bodies and improving the color stability of hydrocarbon mixtures by treatment with sulfur trioxide complex.

Still another object of the invention is to provide a process for removing color bodies from, and mitigating their formation in, hydrocarbon mixtures by treatment with sulfur trioxide complex, neutralizing the reaction products, and removing the resulting transformed color bodies.

These and further objects will be described or become apparent as the specification proceeds.

The drawing is a flow diagram to illustrate one embodiment of the invention.

The instant invention is directed to a process wherein a highly colored hydrocarbon mixture is reacted with sulfur trioxide in the form of a complex, the resulting reaction effluent is neutralized with alkali, and a substantially colorless product is recovered from the reaction mixture by fractional distillation. More specifically, our process comprises the steps of (1) reacting a highly colored mixture of hydrocarbons, such as a refinery stream or product, with a small amount of a sulfur trioxide complex; (2) neutralizing the products formed with aqueous alkali; (3) removing the resulting water-soluble color bodies by washing the reaction effluent with water; and (4) distilling substantially colorless product from the residuum. Optionally, the water-washing step (step 3) may be omitted and the neutralized effluent distilled to recover the colorless product.

In carrying out the process, the amount of sulfur trioxide complex used is adjusted to the amount of color bodies and/or color-forming bodies present in the hydrocarbon mixture. In general, this amount of sulfur trioxide complex will be proportioned to the degree of a color present, or color improvement desired, and relatively small amounts have been found to give adequate decolorization or color stability. On a weight percent basis, about 0.01 to 2.0% by weight is sufficient for most purposes. The minimum effective amount may be related to the degree of unsaturation or concentration of unsaturates in the petroleum mixture. Thus the minimum effective amount may be from 0.05 to 0.20 mol of sulfur trioxide complex per mol of double bond present in the hydrocarbon mixture. In general, the amount of sulfur trioxide complex should be substantially less than 1 mol per mol of olefinic double bond in the hydrocarbon mixture to avoid excessive sulfonation of the olefinic and aromatic content of the feed hydrocarbon. By substantially less than a mol per mol ratio is meant that the upper limit of sulfur trioxide complex should not exceed about 0.8 mol per mol of olefinic double bond present. More than this amount may be used provided the temperature of the treatment does not exceed the threshold sulfonation temperature for the main body of hydrocarbons present. The sulfur trioxide complex as used in accordance with this invention may be a combination of sulfur trioxide with any agent capable of sharing an electron with the sulfur atom and capable of liberating sulfur trioxide at the decomposition temperature of the complex. Examples of suitable sulfur trioxide complexes are:

$SO_3$-pyridine complex
$SO_3$-trimethylamine complex
$SO_3$-triethylamine complex
$SO_3$-dimethylformamide complex
$SO_3$-dioxane complex
$SO_3$-dioxane bis complex
$SO_3$-thioxane complex
$SO_3$-thioxane bis complex and
$SO_3$-dimethylaniline complex The reactivity of sulfur trioxide complexes varies with the complexing agent used therewith. For example, sulfur trioxide-dioxane complex is an active sulfonating agent, and when used in excessive amounts will effect the sulfonation of a large amount of the olefinic and/or aromatic constituents present in the feed mixture. Consequently, when using the more active complexes, care should be exercised in controlling the amount of complex used and the reaction temperature, or both, to avoid this result. Certain of the complexes, such as $SO_3$-pyridine complex do not have the property of sulfonating the hydrocarbons to a great extent. $SO_3$-pyridine complex, for example, does not react with benzene at 120° C., but $SO_3$-dioxane complex reacts slowly with benzene at room temperature. Accordingly, the temperature of the reaction mixture of $SO_3$ complex and hydrocarbon mixture should be maintained at about 60° C. to 100° C. for the lesser reactive complexes listed heretofore, and no higher than about 120° C. The more reactive complexes may be successfully used at temperatures ranging from 50° C. to 95° C., which would include the dioxane and thioxane complexes.

In order to illustrate the invention, a number of examples are given:

EXAMPLE 1

A 120-g. portion of "coker distillate," having a bromine number of 33, an IBP of 249° C., an EBP of 320° C., and a dark brown color, was added to the dioxane-sulfur trioxide complex which had been prepared from 22 g. of dioxane and 20 g. of sulfur trioxide in 50 ml. of ethylene dichloride. Only a small amount of heat was liberated, the temperature increasing from 20° C. to about 24° C. The resulting mixture was stirred over a period of 30 minutes while the temperature was increased to 90° C., very little change in the appearance of the brown mixture being observed, and was maintained at 90° C. and stirred for 1 hour, during which time the color darkened slightly.

At the end of this period, the mixture was cooled to room temperature, treated with 60 ml. of water containing 11 g. of sodium hydroxide, and washed with water. The aqueous extract contained dark-brown products. Distillation of the organic layer yielded small amounts of water, ethylene dichloride, and dioxane, and 78.0 g. of colorless hydrocarbon product (bromine number 14, IBP 250° C., EBP 315° C.). The small amount (8 g.) of brown residue which remained in the distilling flask probably could have been reduced by more efficient water washing before distillation. The colorless product amounted to about 65% of the charge stock. Distillation of the raw feedstock in a batch fractionation still having about 11 theoretical plates, at a reflux ratio of about 2/1, did not change the color to any significant extent.

EXAMPLE 2

A 120-g. portion of the "coker distillate" used in Example 1 is added to the dioxane-sulfur trioxide complex prepared from 11 g. of dioxane and 10 g. of sulfur trioxide in 25 ml. of ethylene dichloride. Using substantially the same procedure used in Example 1, except that the treatment is conducted at room temperature, about 99 g. of colorless distillate can be recovered. In this example, the color of the distillate is greatly improved without significant effect on any other constituents of the feedstock.

EXAMPLE 3

A gasoline blend comprising a mixture of paraffinic, naphthenic, aromatic, and olefinic hydrocarbons boiling in the range of about 145° to 450° F. and having an NPA color of 4+, on treatment in accordance with the procedure outlined in Example 1, yields a colorless product.

EXAMPLE 4

An odorless naphtha having a boiling range of about 430° to 550° F. and a color index of NPA of 4½, on treatment in accordance with the procedure of Example 1, yields a colorless product.

EXAMPLE 5

An alkylate prepared from the reaction of butene and isobutylene, having a color index of NPA 3½, on treatment in accordance with the procedure of Example 1, yields a colorless product.

EXAMPLE 6

A kerosene having an NPA color index of 2½, on treatment in accordance with the procedure of Example 1, yields a colorless product.

EXAMPLE 7

A cracked distillate having an NPA color index of 4½, on treatment in accordance with the procedure of Example 1, yields a colorless product.

In order to illustrate that dioxane alone, which has been used as a decolorizing agent for certain materials, has no effect on hydrocarbon mixtures, particularly distillates, the following example is given:

EXAMPLE 8

"Coker distillate," 200 ml., was treated with 100 ml. of dioxane. The resulting dark-amber liquid was a homogeneous one-phase system. Extraction with four 100-ml. portions of distilled water gave the following results:

| Extract | Volume, ml. | Appearance of Extract |
| --- | --- | --- |
| 1 | 170 | Light yellow. |
| 2 | 130 | Very light yellow. |
| 3 | 100 | Colorless. |
| 4 | 100 | Do. |
| Residue | 200 | |

The dioxane is apparently quantitatively removed from the coker distillate-dioxane mixture by the aqueous extraction. The residual distillate was slightly improved in color, but there was no significant removal of color bodies. Distillation of the residual distillate in vacuo gave 190 ml. (95%) of recovered distillate. This material was green. Thus, there is definite color improvement on treatment with dioxane, extraction, and then distillation, but the recovered material is not colorless.

In addition, such dioxane complexes as dioxane-dibromide, dioxane-diiodide, dioxane-picrate, and the hydrogen chloride and bromide oxonium salts of dioxane do not have sufficient reactivity to be useful in the instant process.

A typical process based on our invention is shown schematically in the accompanying drawing. Sulfur trioxide is introduced through line 10 into reactor 12 where it combines with inert solvent and dioxane, entering through line 14, to form a solution or slurry of complexed sulfur trioxide. Make-up solvent and dioxane are admitted through lines 16 and 18 as required. The resulting slurry of complex in solvent passes through line 20 to treating tank 22, where it is mixed and reacted with feedstock entering through line 24. The resulting mixture passes through line 26 to neutralizing tank 28, where it contacts aqueous alkali solution introduced through line 30.

From tank 28, the hydrocarbon phase, consisting of treated stock, solvent, and dioxane, flows through line 32 to distillation tower 34, while the aqueous phase, containing dissolved color bodies, is withdrawn through line 36. Treated, substantially colorless product, along with dioxane and solvent, is transferred from tower 34 through line 38 to distillation tower 40, while colored residue is withdrawn through line 42. Dioxane and solvent are transferred from tower 40 through line 44 to dryer 46, while colorless product is withdrawn through line 48. Dried dioxane and solvent are recycled from dryer 46 through line 14 to reactor 12.

The reaction of the hydrocarbons or hydrocarbon mixture to be decolorized with sulfur trioxide in complexed form may be conducted in the liquid, vapor, or mixed phase, and no particular apparatus or procedure need be followed, i.e., the reactants may be introduced in any order, preheating of the reactants may be practiced and various types of agitators or recycle techniques may be applied. The decolorizing treatment of this invention may be applied in a manner to permit introduction of the $SO_3$ complex and treatment at the existing temperature at any point in the refining operation.

Several advantages come from the process. The sulfuric acid content of the treated stock is almost nil. The reaction can be made to proceed at any rate by the proper choice of $SO_3$ complex. Adequate control of the process is assured by preparing or complexing the sulfur trioxide before it contacts the hydrocarbon to be treated. Various $SO_3$ complexes now known have differing degrees of activity, and selection of the complexing agent may be made so as to permit use of the process in conjunction with other refining processes. Complexes may be selected which can be stored in ordinary vessels and in contact with air or moisture. Close control of the severity of treat can be had by control of the amount of sulfur trioxide in the complex. One method of determining the amount of sulfur trioxide in the complex is by titration. The activity of the complex is under close control where necessary, and excessive treats are avoided by tailor-making the complex for the particular type of hydrocarbon or color body to be treated. The required amount of complex can be predetermined by tests and then the prescribed amounts metered into the refining stream or system as a slurry, or, in some instances, as a solution in an inert solvent. In some cases the $SO_3$ complexes may be used as mixtures of more than one type and applied either in liquid, vapor, or solid form. With those hydrocarbons which are unreactive to sulfur trioxide, the $SO_3$ complex may be formed in situ by first adding the complexing agent and then adding the sulfur trioxide.

The process of this invention may be applied to any liquid or liquifiable hydrocarbon or hydrocarbon mixture which can be benefitted by decolorization, whether the color therein is from a natural source, has been formed as a result of deterioration of the hydrocarbon, or has been added through some processing or blending operation. The term "hydrocarbon" or "hydrocarbon mixture" is intended to include substantially pure liquid hydrocarbons, mixtures of different hydrocarbons, natural hydrocarbon products, various refinery products such as gasolines, kerosenes, distillates, cracked distillates, alkylates, isomerization products, cracking products, polymerization products, hydrogenation products, clay-treated products, cyclization products, and various naphthas, light distillates, solvent naphthas, and V.M.P. naphthas. These various hydrocarbons may contain additives and the like, as long as they do not interfere with the decolorization process. The boiling range of the hydrocarbons may vary from about 80° F. to 650° F. or higher. Specific examples of materials that may be benefitted by the process of this invention are gasolines, kerosenes, paint solvents, cleaner's solvents, butene-isobutylene alkylates, coker distillates, and any of the series of products known as solvent naphthas and aromatic solvents.

As an example of the preparation of coker distillate, reduced crude, from which the volatile materials have been removed, is pumped through a surge tank and preheated to about 650° F. The preheated reduced crude is passed through a heated coil, maintained at a temperature of about 750–900° F., and passed to the bottom of a fractionating tower wherein virgin gas oil is one of the primary products. The unvaporized portion of the reduced crude together with a recycle material obtained from the coker drums, to be described, is passed from the bottom of the fractionator to a coking heater. The products from the coking heater, at a temperature of about 900 to 920° F. pass into the bottom of two coking chambers. The coking chambers are of such size as to require approximately 24 hours to fill with coke and to achieve continuity of operation, one chamber receives the preheated residue from the fractionator while coke is being removed from the other. The vapor products from the coking drums, at a temperature of about 800 to 820° F., are passed to the bottom of the fractionator. Fractionation of these two feeds produces one or more products which are primarily olefinic and which may be used alone or in admixture as feed for the instant invention. These products are a gas oil, boiling at about 550 to 850° F.; a furnace oil, boiling at about 400° to 600° F.; a naphtha, boiling at about 250 to 420° F.; and a 270 EP unstable gasoline. Each product is passed through a stripper and accumulator before final separation. A typical operation of a coker unit will consume about 7,000 b.p.d. of reduced crude and produce about 500 to 600 b.p.d. of unstable gasoline, 400 to 700 b.p.d. of naphtha, 400 to 700 b.p.d. of light distillate (furnace oil), and from 1,200 to about 4,000 b.p.d. of heavy distillate or gas oil.

Table I shows the general characteristics of the source reduced crude and the products therefrom which may be used as starting materials for this invention.

Table I

| Property | Source | Products | | | |
|---|---|---|---|---|---|
| | Reduced Crude | Heavy Gas Oil | Light Gas Oil | Naphtha | Gasoline |
| Gravity | 19–20 | 25–28 | 36–40 | 48–52 | |
| IBP | 400–500 | 450–530 | 380–410 | 240–260 | 90–95 |
| Pour Point | 45–70° | 50–75° | −15 to −20 | | |
| Percent sulfur | 0.73–0.93 | 0.53–0.69 | 0.21–0.46 | 0.16–0.23 | 0.15–0.20 |
| C.R. | 6.5–7.20 | 0.05–0.15 | 0.11–0.22 | | 0.14–0.20 |
| Br. No | | | | 63–71 | |

The following table gives the characteristics of typical gasoline, naphtha, light gas oil, and heavy gas oil products which may be used in accordance with this invention along with the characteristics of specific reduced crudes which may be used as starting materials in a coker unit to produce said products.

Table II

| Starting Materials | Color NPA | IBP | E.P. | Percent Sulfur | Octane No. (Clear) | Gravity | Br. No. | Pour, degrees | Vis./ 100° F. | C.R. |
|---|---|---|---|---|---|---|---|---|---|---|
| Gasoline | +8 | 92 | 287 | 0.18 | 69.2 | 67.7 | | | | |
| | +20 | 94 | 285 | 0.14 | 67.8 | 68.5 | | | | |
| Naphtha | 1¼+ | 256 | 456 | 0.16 | 54.5 | 48.5 | | 63.7 | | |
| | 1½+ | 252 | 418 | 0.21 | 55.3 | 49.8 | | 67.3 | | |
| Light Gas Oil | +3½ | 408 | 638 | 0.41 | | 36.7 | | −15 | 34.8 | 0.11 |
| | 3+ | 380 | 614 | 0.44 | | 38.2 | | −20 | 33.4 | 0.14 |
| (C₁₄ to C₁₈ Cut) [1] | 2.5+ | 480 | | | | 35.8 | 33 | | | |
| Heavy Gas Oil | 8+ | 517 | 700 | 0.69 | | 26.4 | | 75 | | 0.07 |
| | 3+ | 528 | 760 | 0.61 | | 26.5 | | 65 | | 0.06 |
| Reduced Crude | | 500 | | 0.73 | | 19.5 | | 50 | 134 | 7.2 |
| | | 366 | | 0.93 | | 20.1 | | 70 | 105 | 7.20 |

[1] FIA analysis, percent (vol.):

| | Percent |
|---|---|
| Naphthenes Paraffins | 44 |
| Olefins | 31 |
| Aromatics | 25 |

Although the invention has been illustrated by various examples, it is not to be limited thereby. The invention relates particularly to the treatment of hydrocarbon distillates which are otherwise difficult to treat, as exemplified by coker distillates which may vary in properties depending somewhat on the source materials from which they are prepared. In general, coker distillates having bromine numbers in the range of 30 to 40, and a boiling range of about 240° C. to 350° C., which are brown to dark brown in color, have been found to be successfully treated in accordance with this invention. Since coker distillates represent a particularly difficult material to treat, it is unexpected that the instant novel process results in almost complete decolorization thereof. Distillates from petroleum sources and other processes which are less difficult to decolorize may advantageously be treated in accordance with this invention, in lieu of other decolorizing methods because of the simplicity of the process and the low cost of treatment. Since the other materials or distillates disclosed herein are of known origin and properties, there is no need to describe their properties or preparation in more detail. The aqueous alkali used in the process may be an alkali metal hydroxide, such as sodium hydroxide, potassium hydroxide, lithium hydroxide, or an alkaline-earth metal oxide or hydroxide, such as barium hydroxide, barium oxide, calcium hydroxide, and calcium oxide. The aqueous solutions of the alkali may be of any effective concentration from dilute, or 1.0% by wt. solutions, to concentrated or saturated solutions containing as much as 347 grams of sodium hydroxide, for example, per 100 mls. of water. The amount of alkali used should be at least sufficient to react with all of the acidic reaction products formed in the treatment with the sulfur-trioxide complex. The use of an excess, i.e., 1.0% to 20% over stoichiometric amounts of alkali to react with the acidic products, is normally used to insure their complete neutralization and subsequent removal from the decolorized product. The separation of the aqueous neutralized color bodies and other products from the alkali treatment may be accomplished by decanting, centrifuging, or other known separation methods.

In determining the color of the products prepared in accordance with this invention the Saybolt chromometer may be used, following the test method ASTM D 156–53T as applied to petroelum solvents and naphthas. In general, the term colorless, as used herein, is intended to mean ASTM No. 1, NPA No. 1, or lily-white to clear as water.

The embodiments of the invention, in which an exclusive property or privilege is claimed, are defined as follows:

1. The process of decolorizing hydrocarbons which comprises contacting said hydrocarbons with sulfur trioxide complex and separating a substantially color-free product, said sulfur trioxide complex being a combination of sulfur trioxide with an organic agent having an atom containing unshared electrons and capable of liberating sulfur trioxide at the decomposition temperature of the complex.

2. The process of decolorizing hydrocarbon mixtures which comprises contacting said mixtures with sulfur trioxide complex under conditions whereby said sulfur trioxide complex reacts with the color bodies therein and separating a substantially color-free product from the unreacted sulfur trioxide complex, said sulfur trioxide complex being a combination of sulfur trioxide with an organic agent having an atom containing unshared electrons and capable of liberating sulfur trioxide at the decomposition temperature of the complex.

3. The process of decolorizing olefinic hydrocarbon mixtures which comprises reacting said mixtures with sulfur trioxide complex at a temperature between about 60° and 120° C., said complex being present in an amount sufficient to supply about 0.05 to 0.20 mol of sulfur trioxide per mol of olefinic double bond present in said mixtures and recovering a substantially color-free product, said sulfur trioxide complex being a combination of sulfur trioxide with an organic agent having an atom containing unshared electrons and capable of liberating sulfur trioxide at the decomposition temperature of the complex.

4. The process of decolorizing hydrocarbon mixtures containing unstable color-forming olefinic constituents which comprises reacting said mixtures with sulfur trioxide complex under conditions whereby said sulfur trioxide reacts with the unstable color-forming olefinic constituents and separating a color-free product from said reaction mixture, said sulfur trioxide complex being a combination of sulfur trioxide with an organic agent having an atom containing unshared electrons and capable of liberating sulfur trioxide at the decomposition temperature of the complex.

5. The process in accordance with claim 4 in which the hydrocarbon mixture is a hydrocarbon distillate.

6. The process in accordance with claim 5 in which the hydrocarbon distillate is a coker distillate.

7. The process in accordance with claim 6 in which said coker distillate is characterized by having a bromine number of about 30 to 40, a boiling range of about 240° to 350° C., and is dark-brown in color prior to treatment.

8. The process in accordance with claim 4 in which the sulfur trioxide complex is sulfur trioxide-dioxane.

9. The process in accordance with claim 4 in which the sulfur trioxide complex is sulfur trioxide-pyridine.

10. The process in accordance with claim 4 in which the sulfur trioxide complex is sulfur trioxide-dioxane bis.

11. The process in accordance with claim 4 in which the sulfur trioxide complex is sulfur trioxide-thioxane.

12. The process in accordance with claim 4 in which the sulfur trioxide complex is sulfur trioxide-dimethylformamide.

13. The process of decolorizing hydrocarbon mixtures which comprises contacting said mixtures with sulfur trioxide complex at a temperature of about 60° to 120° C., neutralizing the products formed with an aqueous alkali, and distilling a substantially colorless product from the residuum, said sulfuro trioxide complex being a combination of sulfur trioxide with an organic agent having an atom containing unshared electrons and capable of liberating sulfur trioxide at the decomposition temperature of the complex.

14. The process in accordance with claim 13 in which the water-soluble color bodies and neutralized reaction products are separated prior to distillation.

15. The process in accordance with claim 13 in which the hydrocarbon mixture contains unstable color-forming olefinic constituents, and said sulfur trioxide complex is present in an amount sufficient to supply about 0.05 to 0.20 mol of sulfur trioxide per mol of olefinic double bond present in the hydrocarbon mixture.

16. The process in accordance with claim 13 in which the sulfur trioxide complex is sulfur trioxide-dioxane.

17. The process in accordance with claim 13 in which the sulfur trioxide complex is sulfur trioxide-pyridine.

18. The process in accordance with claim 13 in which the sulfur trioxide complex is sulfur trioxide-dioxane bis.

19. The process in accordance with claim 13 in which the sulfur trioxide complex is sulfur trioxide-thioxane.

20. The process in accordance with claim 13 in which the sulfur trioxide complex is sulfur trioxide-dimethylformamide.

References Cited in the file of this patent

UNITED STATES PATENTS

| | | |
|---|---|---|
| 1,791,941 | Steik | Feb. 10, 1931 |
| 1,946,131 | Davis | Feb. 6, 1934 |
| 2,581,064 | Archibald | Jan. 1, 1952 |
| 2,908,638 | Fear | Oct. 13, 1959 |